Dec. 13, 1927.

J. J. CURTIS 1,652,702

TRAP

Filed May 18, 1927

Inventor:
Jeremiah J. Curtis.
by Charles S. Gooding atty.

Patented Dec. 13, 1927.

1,652,702

UNITED STATES PATENT OFFICE.

JEREMIAH J. CURTIS, OF WOLLASTON, MASSACHUSETTS.

TRAP.

Application filed May 18, 1927. Serial No. 192,264.

This invention relates to a trap and particularly to a type of trap employed in connection with sinks, wash bowls, bath tubs, and the like, for prevented the escape of gas from the sewerage system.

The object of the invention is to provide a trap of the character mentioned that may be easily installed in any location to meet the different conditions that are presented, the device being invertible and provided with similar openings in the top and bottom faces thereof, either of which may be employed as a clean-out opening or to receive an inlet or discharge connection; and there also being a plurality of side openings either or all of which may have either inlet or discharge pipes connected thereto.

The invention consists in a trap as set forth in the following specification and particularly as pointed out in the claims thereof.

Referring to the drawings.

Like numerals refer to like parts throughout the several views of the drawings.

Figure 1:
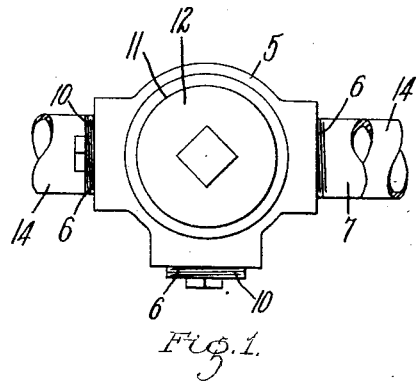
Figure 1 represents a plan view of a trap embodying my invention.

In the drawings, 5 is a body portion of a trap, preferably formed of cast iron and having a plurality of screw-threaded openings 6 extending through the side thereof and communicating with the interior thereof, said openings all being of the same diameter and being located adjacent to one of the end faces of said body portion.

Figure 3:
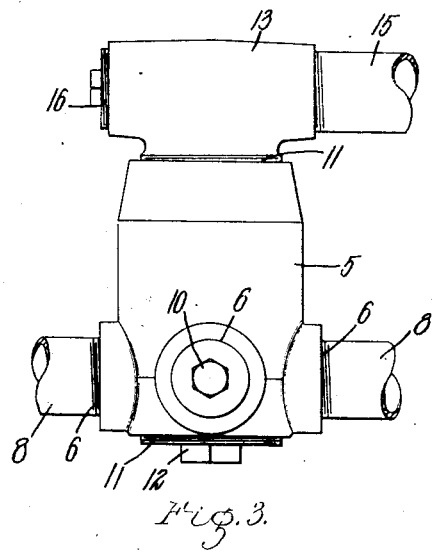
Fig. 3 is a front elevation of the trap in an inverted position.
Figures 2, 4:
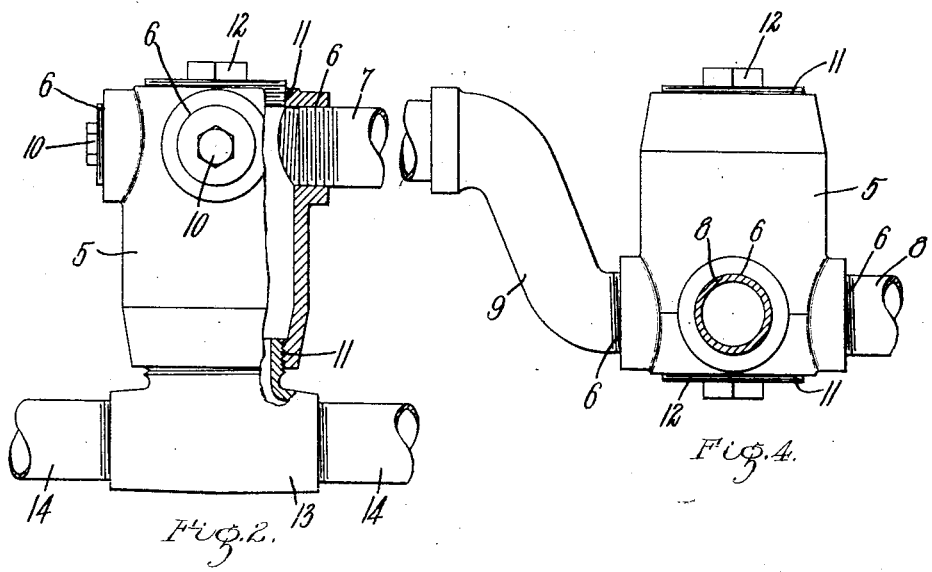
Fig. 2 is a front elevation of the trap, a portion thereof being broken away and shown in section.
Fig. 4 is a front elevation of the trap illustrating another method of employing the same.

A discharge pipe 7 may be connected to the body portion 5 at one of the openings 6, as illustrated in Fig. 2, or one or more inlet pipes 8 may be connected to said body portion at said openings 6, as illustrated in Fig. 3, or one or more inlet pipes 8 and a discharge fitting 9 may be connected to said body portion at said openings as illustrated in Fig. 4. Where no pipes are connected to the body portion 5 at the openings 6, the latter are closed by screw plugs 10, as illustrated in Figs. 2 and 3.

Located in the opposite end faces of the body portion 5 are similarly formed screw-threaded openings 11, either or both of which may receive clean-out covers 12. In Fig. 2 the opening 11 at the top of the body portion 5 has a clean-out cover 12 therein and the opening 11 in the bottom face of said body portion has a special T fitting 13 mounted therein. In Fig. 3 where the body portion 5 is inverted from the position illustrated in Fig. 2, the T 13 is located at the top of said body portion and the clean-out cover 12 is located at the bottom of said body portion. In Fig. 4 clean-out covers 12 are located at both the top and bottom of the body portion 5. The T 13 may have inlet pipes 14 connected thereto at the opposite ends thereof, as illustrated in Fig. 2, or a single discharge pipe 15 as illustrated in Fig. 3, and in the latter case one of the ends of said T 13 is closed by a screw plug 16.

While the body portion 5 of this invention is illustrated as being provided with three openings 6 and the T 13 is illustrated as having but two inlet pipes 14 connected thereto, it is evident that said body portion and T may be provided with other openings therein for the reception of other inlet or discharge pipes, as may be desired.

By constructing a trap as hereinbefore described, it is evident that said trap may be employed in many different positions, being placed in small areas between partitions, beneath floors, and in limited spaces directly beneath wash tubs, sinks, or other plumbing apparatus for which they are provided, in each instance the clean-out cover being easily accessible and the pipe connections being easily installed.

I claim:

1. A trap having, in combination, a hollow body portion provided with an opening in the top and bottom faces thereof, a fitting, and a clean-out cover, said fitting and cover being interchangeable in said openings, said body portion also being provided with a plurality of openings in the side thereof and adjacent to an end face thereof.

2. A trap having, in combination, a hollow body portion provided with an opening in the top and bottom faces thereof and with a plurality of other openings in the side thereof and adjacent to an end face thereof, a fitting for one of said end openings, and a clean-out cover for the other end opening, said fitting and clean-out cover being interchangeable in said end openings and said body portion being invertible to reverse the relative positions of said fitting and clean-out cover.

In testimony whereof I have hereunto set my hand.

JEREMIAH J. CURTIS.